May 7, 1963 J. L. ROBINSON 3,089,134
METHOD AND SYSTEM FOR ENCODING A SIGNAL
INTO BINARY CODE GROUPS
Filed March 25, 1960 4 Sheets-Sheet 1

INVENTOR.
JOHN L. ROBINSON
BY
Fordyce A. Bothwell
ATTORNEY

May 7, 1963 J. L. ROBINSON 3,089,134

METHOD AND SYSTEM FOR ENCODING A SIGNAL INTO BINARY CODE GROUPS

Filed March 25, 1960 4 Sheets-Sheet 2

INVENTOR.
JOHN L. ROBINSON

BY Fordyce A. Bothwell
ATTORNEY

INVENTOR.
JOHN L. ROBINSON
BY
Fordyce A. Bothwell
ATTORNEY

INVENTOR.
JOHN L. ROBINSON
BY
Fordyce A. Bothwell
ATTORNEY 3,089,134

United States Patent Office

Patented May 7, 1963

3,089,134

METHOD AND SYSTEM FOR ENCODING A SIGNAL INTO BINARY CODE GROUPS

John L. Robinson, Wenonah, N.J., assignor, by mesne assignments, to Philco Corporation, Philadelphia, Pa., a corporation of Delaware Filed Mar. 25, 1960, Ser. No. 17,579
6 Claims. (Cl. 340—347)

This invention relates to systems for binary encoding of a signal, i.e. encoder systems of the type wherein the instantaneous amplitude of a signal, such as a speech signal, is represented by a binary code group.

More particularly, this invention relates to feedback or comparison systems, the basic form of which is shown and described in an article by B. D. Smith, entitled "Coding by Feedback Methods," at pages 1053 to 1058 of the Proceedings of the I.R.E. for August 1953.

In prior systems of this type, each encoding cycle has required a number of encoding operations corresponding to the number of binary code elements in the binary code group which represents the instantaneous amplitude of the signal. For example, in a system employing four binary code elements in each binary code group, each encoding cycle would require four encoding operations.

The need for higher speed signal encoding has engendered various proposals to meet this need. However, such proposals have not been entirely satisfactory for one reason or another.

One object of the present invention is to provide a high speed encoding system which will satisfactorily meet the need for such a system.

Another object of the invention is to provide an improved feedback or comparison system wherein high speed encoding is achieved by multiple encoding operations, each of which produces a plurality of binary code elements.

This invention is based on the concept of repetitive production of plural binary code elements to produce the binary code group representative of the instantaneous amplitude of a signal. For example, where each binary code group comprises four binary code elements, each encoding cycle, instead of involving four encoding operations, may involve two encoding operations each producing two of the binary code elements. Thus the encoding speed is doubled.

In a system according to this invention, reference voltages are produced and are compared with the amplitude of the signal being encoded to produce the binary code elements. By repetitive comparison of the signal with plural reference voltages, the amplitude of the signal is determined and is represented by a binary code group.

To explain this further, the amplitude of the signal varies over a given range, and therefore the amplitude of the signal being encoded at any instant may be at any level within said range. By comparing the signal with each of a number of reference voltages representing different amplitude levels within said range, it is determined that the amplitude of the signal is within a certain sub-range, and this information is encoded into binary code elements. Then by comparing the signal with each of a number of reference voltages representing different amplitude levels within said sub-range, it is determined that the amplitude of the signal is within a vertain portion of said sub-range, and this information is encoded into binary code elements.

The invention may be fully understood from the following detailed description with reference to the accompanying drawings wherein.

Figure 1:
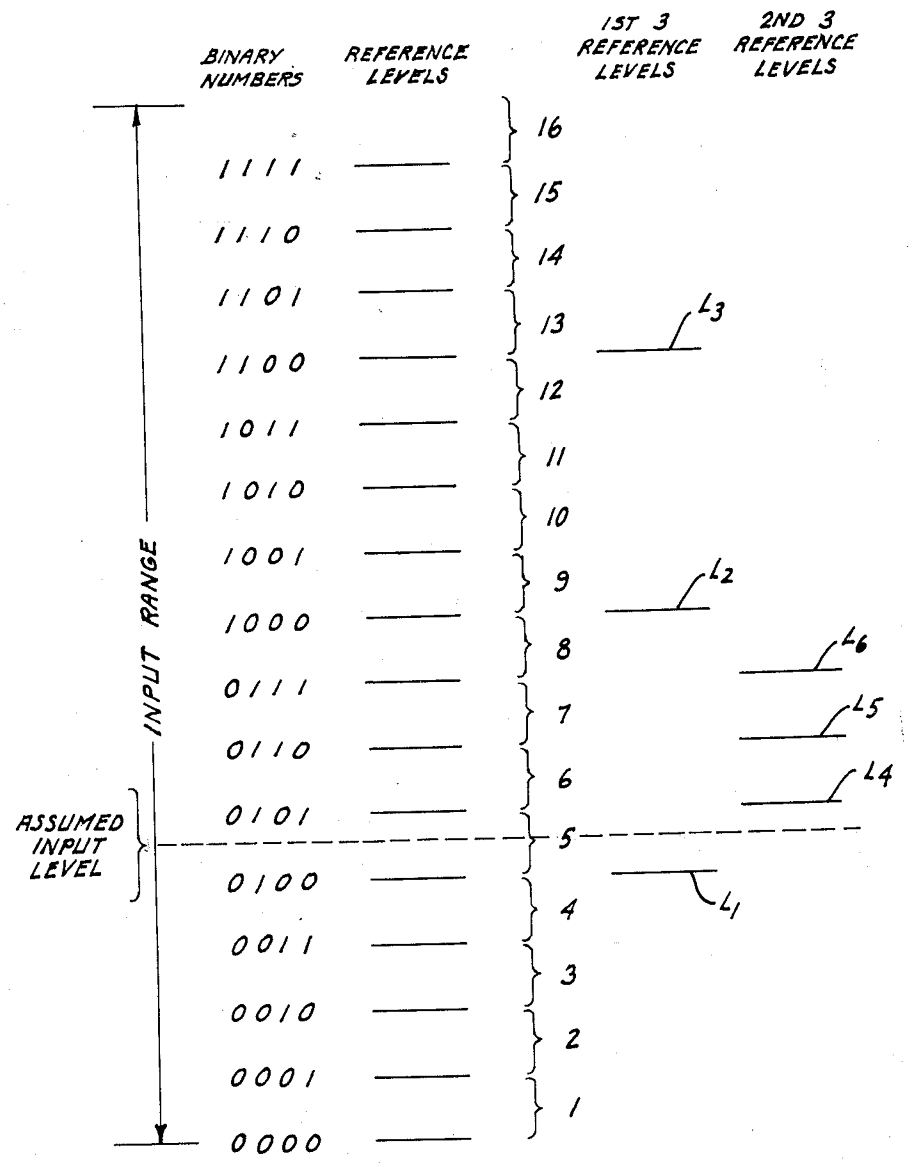
FIG. 1 shows a binary code and illustrates the principle on which the present invention operates.

Referring first to FIG. 1, by way of example, it is assumed that in the binary code employed each binary code group or number contains four of the digits or binary code elements 0 and 1. In such case there are 16 binary numbers as shown, which represent different reference voltage levels and which define small portions or sub-ranges of the signal amplitude range. In other words, the amplitude range over which the signal varies is divided into sixteen sub-ranges as indicated, and the amplitude within each of these sub-ranges is represented by the lower binary number.

Suppose, for example, that the amplitude of the signal to be encoded at some given instant is within the fifth sub-range as indicated by the broken line. To determine this and to encode the signal, the binary numbers 0100, 1000 and 1100 are first decoded to produce three reference voltages representative respectively of the amplitude levels $L_1$, $L_2$ and $L_3$. Then the signal amplitude is compared with each of said voltages and it is determined that the amplitude of the signal sample is within the sub-range $L_1$–$L_2$ wherein the first two binary code elements of each binary code group are 01. The results of the comparisons are therefore encoded into the binary code elements 0 and 1. Then the binary numbers 0101, 0110 and 0111 within the sub-range $L_1$–$L_2$ are decoded to produce three reference voltages representative respectively of the amplitude levels $L_4$, $L_5$ and $L_6$. The signal amplitude is compared with each of the latter reference voltages and it is determined that the amplitude of the signal is within the sub-range represented by the number 0100. The results of the latter comparisons are therefore encoded into the binary code elements 00, thus completing the encoding of the instantaneous amplitude of the signal into the binary code group 0100.

From the foregoing description it will be seen that the encoding process of the present invention involves the employment of reference voltages which are successively definitive of decreasing sub-range portions of the signal range.

Figure 2:
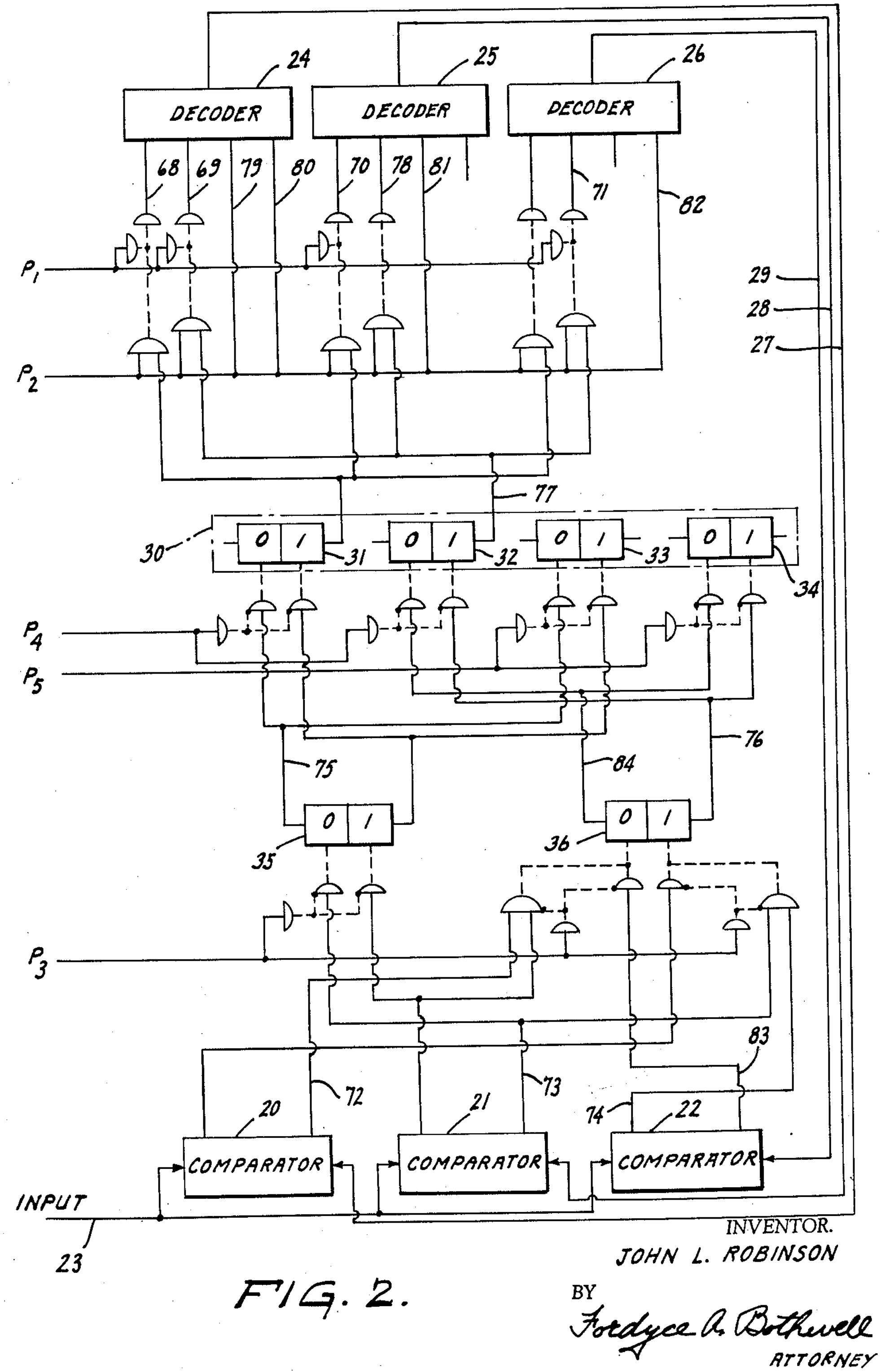
FIG. 2 is a symbolic and block diagram of one system according to this invention.

Referring now to FIG. 2, there is shown a system for encoding successive samples of the amplitude of a signal in the manner described above with reference to FIG. 1. As hereinafter described, the illustrated system employs p-n-p transistors, although n-p-n transistors could be employed. With p-n-p transistors, the signal is of negative polarity. The system comprises three comparators 20, 21 and 22, to each of which the signal is supplied via the input connection 23. The reference voltages for comparison with the signal are produced by three decoders 24, 25 and 26 and are supplied to the comparators over connections 27, 28 and 29. The system further comprises the storage register 30 which may comprise four bistable circuits 31 to 34 for storing four binary code elements. The system also comprises bistable circuits 35 and 36 whose purpose is to store the results of a set of comparisons while transferring into the storage register. If the results of a set of comparisons were not stored in bistable circuits 35 and 36 the following might happen: The outputs of the comparators might change thus changing the contents of the storage register. This would change the outputs of the decoders which in turn would change the outputs of the comparators, and a type of oscillation could thus build up.

The other components of the system designated symbolically are of the character hereinafter described. Program or timing pulses $P_1$ to $P_5$ (FIG. 3) for operating the system are supplied to the lines in FIG. 2 similarly designated. The pulses may be produced by conventional devices such as ring counters.

Figure 3:
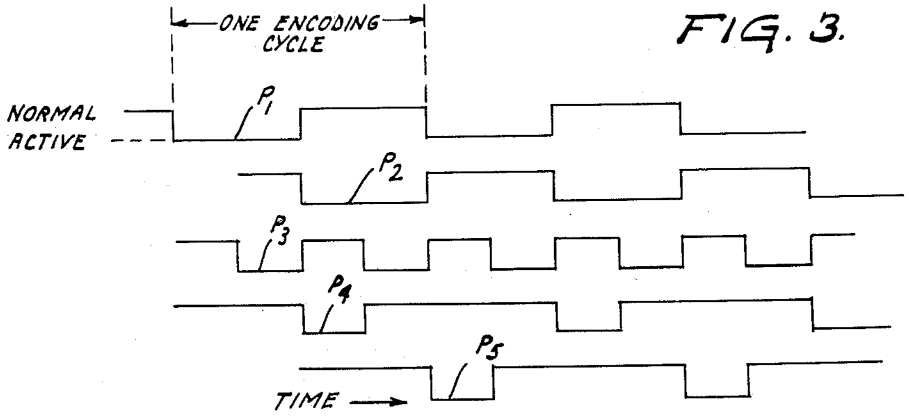
FIG. 3 is a timing diagram which will better enable an understanding of the operation of the system shown in FIG. 2.

Referring to FIG. 3, the pulses there shown for use in the system of FIG. 2 are all negative, that is in each of the five waveforms the upper level represents the inactive or normal state of the line while the lower level represents the active state of the line. However, the system could be designed for use of positive pulses.

Figure 4:
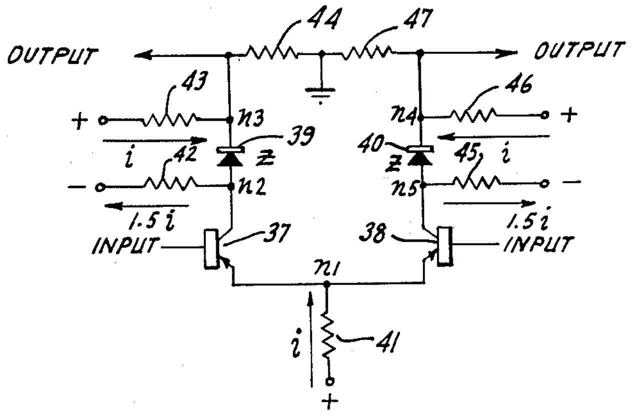
FIG. 4 is a schematic diagram of one form of amplitude comparator which may be used in the system of FIG. 2.

With respect to the system components, each of the comparators 20, 21 and 22 in the system of FIG. 2 may be of the form shown in FIG. 4 which comprises transistors 37 and 38, diodes 39 and 40, and resistors 41 to 47, connected as shown.

The operation of each comparator will be explained with reference to FIGURE 4. Resistors 41, 42, 43, 45, and 46 are relatively large resistors returned to rather high supply voltages; therefore, the currents through these resistors will be considered constant. Resistors 41, 43, and 46 will be assumed to conduct a constant current, $i$ in the direction shown in the figure, and resistors 42 and 45 will be considered to conduct a constant current $1.5i$ in the direction shown.

The current through resistor 41 flows into node $n_1$ which is also common to the emitters of the two transistors, 37 and 38. The current through resistor 41 will flow from node $n_1$ into the emitter of the transistor having the more negative base voltage. For example, assume that the signal supplied to the base of transistor 37 is more negative than the signal supplied to the base of transistor 38. Transistor 37 will conduct the current from node $n_1$ and the emitter of transistor 37 will be positive with respect to its base by a small voltage equal to the diode drop in the transistor. If the base voltage of transistor 38 is positive relative to the base voltage of transistor 37 by an amount equal to or greater than the diode drop of a conducting transistor then transistor 38 will be cut off.

When transistor 37 is conducting and transistor 38 is cut off a current nearly equal to $i$ will flow from the collector of transistor 37 into $n_2$. However, a current of $1.5i$ will flow from $n_2$ through resistor 42; therefore, a current of $0.5i$ must flow from $n_3$ through the zener diode 39 to $n_2$. This leaves a net current of $0.5i$ flowing into $n_3$ which must flow to ground through resistor 44. This results in a positive voltage at $n_3$ and also on the left output line. Referring to the right collector circuit, no current flows from the collector of transistor 38; therefore, a current of $1.5i$ must flow from $n_4$ to $n_5$. This leaves a net current of $0.5i$ flowing from $n_4$ which must come from ground through resistor 47. This results in a negative voltage at $n_4$ and also on the right output line. As will be seen from the subsequent description, it is the negative output voltage which is effective.

If the relative polarities of the input voltages are reversed transistor 37 will be cut off and transistor 38 turned on, in which case the currents in resistors 44 and 47 will be reversed and the output signals will switch. The output signals of the comparator, therefore, indicate the relative polarities of the input voltages.

It is possible, when the comparator input voltages are very nearly equal, to have both transistors 37 and 38 conducting part of the emitter current; however, as long as the input voltages differ by some small amount the output voltages will be of the proper polarity, and while the output voltages will be reduced in amplitude this will not prevent the successful operation of the system.

The reason for the zener diodes in the collector circuits is to keep a negative voltage on the collectors of the transistors and thus prevent saturation.

Figure 5:
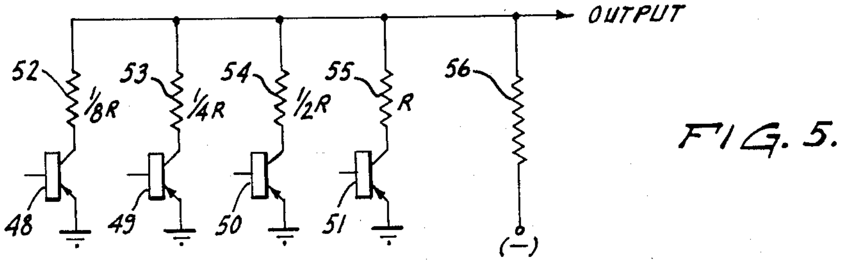
FIG. 5 is a schematic diagram of one form of decoder which may be used in the system of FIG. 2.

Each of the decoders 24, 25 and 26 in the system of FIG. 2 may be of the form shown in FIG. 5 which comprises transistors 48 to 51, resistors 52 to 55 related as indicated, and common load resistor 56.

The operation of each decoder will be explained with reference to FIGURES 2 and 5. Referring first to FIGURE 5, it will be assumed that resistor 56 is small compared to the resistors 52 through 55 so that the voltage at the output is not large enough to effect the current through any of the branches containing resistors 52 through 55. Furthermore, it will be assumed that: A current $i$ flows in resistor 55 when transistor 51 is turned on; a current $2i$ flows in the branch containing resistor 54 when transistor 50 is turned on, etc. If transistors 48 through 51 are thought of as being turned on by binary signals applied to their bases, the currents through the various branches add in resistor 56 to provide a voltage at the output which is linearly related to the binary number applied. Transistor 48 receives the most significant bit, transistor 49 the second most significant bit, transistor 50 the third most significant bit, and transistor 51 the least significant bit. For the circuit shown, a One in any digit position may be represented by a negative voltage on the base of the appropriate transistor. The output voltage increases in a positive direction for increasing values of the binary number applied to the bases of transistors 48 through 51.

Referring to FIGURE 2 the input lines to the decoders are normally at ground so that an active line, or a One, into a decoder results in a negative voltage at the base of the corresponding transistor. Thus if lines 68 and 69 into decoder 24 go active and lines 79 and 80 are normal, this corresponds to the binary number 1100 in FIG. 1 and the decoder produces an output voltage representative of the reference level $L_3$ in FIG. 1.

The symbolic showing in FIG. 2 of the other system components will now be explained in terms of direct-coupled transistor circuits. In practice other types of coupling could just as well be used; however, the direct-coupled circuits are chosen for the examples in the interests of simplicity.

The symbology consists of circuit elements connected by lines. In the illustrated system, p-n-p transistors are employed, and a line can be either at ground or at a negative potential. The output line of a circuit changes from its normal to its active value when the circuit is performing its logical function. Lines which are normally at ground are represented by solid lines, and lines which are normally negative are represented by broken lines. Lines normally at ground go negative when they go active, and lines normally negative go to ground when they go active.

Figure 6:
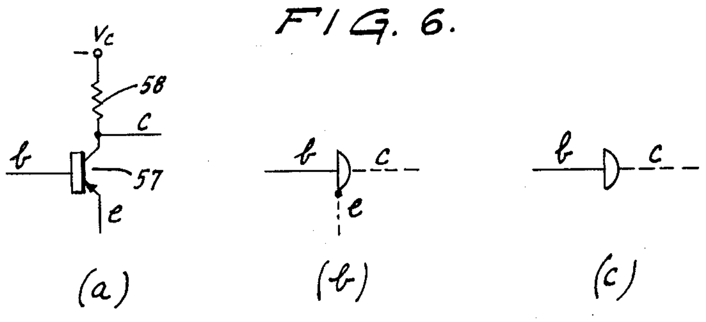
FIGS. 6 to 8 are explanatory of the symbols employed in FIG. 2.

Referring now to FIG. 6($a$), there is shown a transistor 57 and its load resistor 58. The base, emitter and collector lines are designated by letters $b$, $e$ and $c$. The symbol therefor is shown in FIG. 6($b$). According to this symbolic showing, $b$ is normally at ground and $c$ and $e$ are normally negative, and the transistor is normally turned off and it is turned on and $c$ goes active only when $b$ and $e$ are both active. If the emitter is connected to ground, only $b$ needs to go active and the emitter line is omitted from the symbol as shown in FIG. 6($c$).

Figure 7:
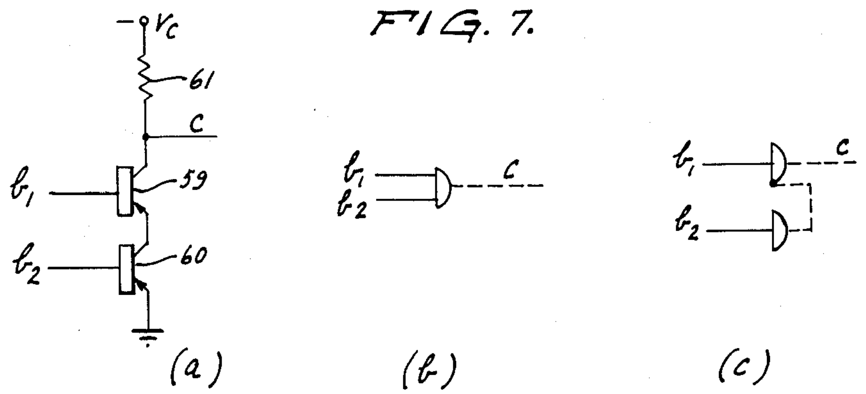

Referring now to FIG. 7($a$), there is shown a circuit comprising two transistors 59 and 60 in series and a load resistor 61. The two base lines are designated $b_1$ and $b_2$. This circuit is represented by either of the symbols shown in FIGS. 7($b$) and 7($c$). According to each symbol, $c$ is active only when $b_1$ and $b_2$ are both active.

Figure 8:
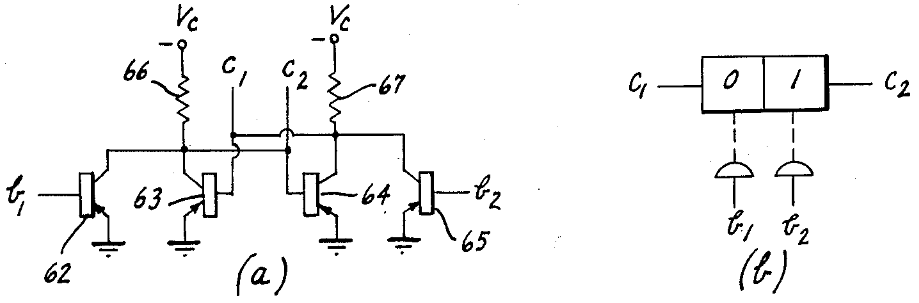

Referring now to FIG. 8($a$), there is shown a bistable circuit which may be employed for each of the bistable circuits in the system of FIG. 2. The circuit comprises transistors 62 to 65 and load resistors 66 and 67. When $b_1$ goes negative, transistor 62 is turned on and consequently transistor 64 is turned off, transistor 63 is turned on, and $c_1$ goes negative. When $b_2$ goes negative, transistor 65 is turned on and consequently transistor 63 is turned off, transistor 64 is turned on, and $c_2$ goes negative.

FIG. 8(*b*) shows the symbolic representation of the circuit. When line $b_1$ is active, line $c_1$ is active and remains so until line $b_1$ becomes normal or inactive and line $b_2$ becomes active. Similarly when line $b_2$ is active, line $c_2$ is active and remains so until line $b_2$ becomes normal and line $b_1$ becomes active. When line $c_1$ is active, it is representative of storage of a "zero," and when $c_2$ is active it is representative of storage of a "one," as indicated in the symbolic showing of FIG. 8(*b*).

The operation of the system of FIG. 2 through one encoding cycle will now be described with the aid of the timing diagram of FIG. 3. Assuming again that the signal amplitude to be encoded is represented by the broken line in FIG. 1, line $P_1$ goes active and consequently lines 68, 69, 70 and 71 into the decoders go active. The decoders therefore produce three reference voltages corresponding to the levels $L_1$, $L_2$ and $L_3$ in FIG. 1. Decoder 24 produces reference voltage $L_3$, decoder 25 produces reference voltage $L_2$, and decoder 26 produces reference voltage $L_1$. Since the assumed signal amplitude in FIG. 1 is below reference levels $L_3$ and $L_2$, the right-hand output lines 72 and 73 of comparators 20 and 21 go active; and since the assumed signal amplitude is above reference level $L_1$, the left-hand output line 74 of comparator 22 goes active.

The next event in the encoding cycle, as shown by the timing diagram of FIG. 3, is that line $P_3$ goes active. Since line 73 is also active, a "zero" is stored in bistable circuit 35; and since line 74 is also active, a "one" is stored in bistable circuit 36, as may be seen from the symbolic showing in FIG. 2. It should be noted also that lines 75 and 76 are now active.

The next set of events, as may be seen in FIG. 3, is that lines $P_2$ and $P_4$ both go active and lines $P_1$ and $P_3$ both go normal. With line 75 active the "zero" stored in bistable circuit 35 is transferred to bistable circuit 31, and with line 76 active the "one" stored in bistable 36 is transferred to bistable circuit 32. Moreover, line 77 goes active.

Since line $P_2$ is also active at this time, lines 69, 78 and 71 into the decoders go active. And the direct lines 79, 80, 81 and 82 into the decoders also go active. The decoders therefore produce three reference voltages corresponding to the levels $L_4$, $L_5$ and $L_6$ in FIG. 1. Decoder 24 produces reference voltage $L_6$, decoder 25 produces reference voltage $L_5$, and decoder 26 produces reference voltage $L_4$. Since the assumed signal amplitude in FIG. 1 is below all of the reference levels $L_4$, $L_5$ and $L_6$, the right-hand output lines 72, 73 and 83 of all three comparators go active.

The next set of events, as may be seen in FIG. 3, is that line $P_4$ goes normal and line $P_3$ goes active. Since line 73 is also active, a "zero" is stored in bistable circuit 35; and since line 83 is also active, a "zero" is stored in bistable circuit 36. It should be noted also that lines 75 and 84 are now active.

The final set of events in the encoding cycle, as may be seen in FIG. 3, is that lines $P_2$ and $P_3$ go normal and line $P_5$ goes active. Since line 75 is also active, the "zero" stored in bistable circuit 35 is transferred to bistable circuit 33; and since line 84 is also active the "zero" stored in the bistable circuit 36 is transferred to bistable circuit 34. At the same time, line $P_1$ goes active to start the next cycle.

The binary number 0100 now stands in the register 30. The present invention is not concerned with what is done with each binary number as it is stored in the register. It may be read out and put to whatever use is desired, as will be understood by those skilled in the art.

It is believed sufficient to have described the operation of the system for one assumed signal level as above set forth. For any other assumed signal amplitude in any of sixteen numbered sub-ranges in FIG. 1, the operation through an encoding cycle can readily be traced.

From the foregoing description, it will be seen that the encoding process according to this invention comprises successively producing plural reference voltages, comparing the signal with each of the reference voltages, and translating the results of the comparisons into a binary code group representative of the amplitude of the signal.

It should be noted that the precision of a system according to this invention may be increased either by increasing the number of code elements which are encoded simultaneously or by increasing the number of encoding operations. For example, if six binary code elements were employed in each binary code group, the encoding process could comprise two encoding operations, each involving the simultaneous encoding of three elements, or the process could comprise three encoding operations each involving the simultaneous encoding of two elements. It will be understood of course that the invention contemplates such embodiments.

Therefore, while a single embodiment of the invention has been illustrated and described, it is to be understood that the invention is not limited thereto but contemplates such modifications and further embodiments as may occur to those skilled in the art.

I claim:

1. An encoder system for producing a binary code group representative of the instantaneous amplitude of a signal supplied thereto, comprising a plurality of decoders, a corresponding plurality of comparators, means for supplying the individual outputs of said decoders respectively and simultaneously to said comparators, means for supplying a signal simultaneously to all of said comparators, means for translating the outputs of said comparators into binary code elements, means for causing said decoders to supply simultaneously a plurality of predetermined reference voltages of different amplitudes to said comparators, whereupon said translating means translates the outputs of said comparators into a first plurality of binary code elements, and means for causing said decoders to supply simultaneously a plurality of other predetermined reference voltages of different amplitudes to said comparators, whereupon said translating means translates the outputs of said comparators into a second plurality of binary code elements.

2. An encoder system for producing a binary code group representative of the instantaneous amplitude of a signal supplied thereto, comprising a plurality of decoders, a corresponding plurality of comparators, means for supplying the individual outputs of said decoders respectively and simultaneously to said comparators, means for supplying a signal simultaneously to all of said comparators, means for translating the outputs of said comparators into binary code elements, a register, means for transferring the binary code elements to said register, means for causing said decoders to supply simultaneously a plurality of predetermined reference voltages of different amplitudes to said comparators, whereupon said translating means translates the outputs of said comparators into a first plurality of binary code elements which are stored in said register, and means for causing said decoders to supply simultaneously a plurality of other predetermined reference voltages of different amplitudes to said comparators, whereupon said translating means translates the outputs of said comparators into a second plurality of binary code elements which are stored in said register.

3. An encoder system for encoding into a binary code group the instantaneous amplitude of a signal whose amplitude varies within a given range, comprising a plurality of decoders, a corresponding plurality of comparators, means for supplying the individual outputs of said decoders respectively and simultaneously to said comparators, means for supplying said signal simultaneously to all of said comparators, means for translating the outputs of said comparators into binary code elements, means for causing said decoders to supply respectively and simultaneously to said comparators a plurality of predetermined reference voltages respectively representative of different amplitude levels within said signal range, whereby the outputs of said comparators are translated into a first plurality of binary code elements representative of a sub-range within said signal range, and means for causing said decoders to supply respectively and simultaneously to said comparators a plurality of other predetermined reference voltages respectively representative of different amplitude levels within said sub-range, whereby the outputs of said comparators are translated into a second plurality of binary code elements representative of a signal amplitude within said sub-range.

4. An encoder system for encoding into a binary code group the instantaneous amplitude of a signal whose amplitude varies within a given range, comprising a plurality of decoders, a corresponding plurality of comparators, means for supplying the individual outputs of said decoders respectively and simultaneously to said comparators, means for supplying said signal simultaneously to all of said comparators, means for translating the outputs of said comparators into binary code elements, a register, means including a plurality of bistable circuits for transferring the binary code elements to said register, means for causing said decoders to supply respectively and simultaneously to said comparators a plurality of predetermined reference voltages respectively representative of different amplitude levels within said signal range, whereby the outputs of said comparators are translated into a first plurality of binary code elements which are stored in said register and which are representative of a sub-range within said signal range, and means for causing said decoders to supply respectively and simultaneously to said comparators a plurality of other predetermined reference voltages respectively representative of different amplitude levels within said sub-range, whereby the outputs of said comparators are translated into a second plurality of binary code elements which are stored in said register and which are representative of a signal amplitude within said sub-range.

5. An encoder system for encoding into a binary code group of four elements the instantaneous amplitude of a signal whose amplitude varies within a given range, comprising three decoders, three comparators, means for supplying the individual outputs of said decoders respectively and simultaneously to said comparators, means for supplying said signal simultaneously to all of said comparators, means for translating the outputs of said comparators into binary code elements, means for causing said decoders to supply respectively and simultaneously to said comparators three predetermined referance voltages respectively representative of different amplitude levels within said signal range, whereby the outputs of said comparators are translated into a first pair of binary code elements representative of a sub-range within said signal range, and means for causing said decoders to supply respectively and simultaneously to said comparators three other predetermined reference voltages respectively representative of different amplitude levels within said sub-range, whereby the outputs of said comparators are translated into a second pair of binary code elements representative of a signal amplitude within said sub-range.

6. An encoder system for encoding into a binary code group of four elements the instantaneous amplitude of a signal whose amplitude varies within a given range, comprising three decoders, three comparators, means for supplying the individual outputs of said decoders respectively and simultaneously to said comparators, means for supplying said signal simultaneously to all of said comparators, means for translating the outputs of said comparators into binary code elements, a register, means including a plurality of bistable circuits for transferring the binary code elements to said register, means for causing said decoders to supply respectively and simultaneously to said comparators three predetermined reference voltages respectively representative of different amplitude levels within said signal range, whereby the outputs of said comparators are translated into a first pair of binary code elements which are stored in said register and which are representative of a sub-range within said signal range, and means for causing said decoders to supply respectively and simultaneously to said comparators three other predetermined reference voltages respectively representative of different amplitude levels within said sub-range, whereby the outputs of said comparators are translated into a second pair of binary code elements which are stored in said register and which are representative of a signal amplitude within said sub-range.

References Cited in the file of this patent

UNITED STATES PATENTS

| | | |
|---|---|---|
| 2,736,006 | Langevin et al. | Feb. 21, 1956 |
| 2,775,754 | Sink | Dec. 25, 1956 |
| 2,787,418 | MacKnight et al. | Apr. 2, 1957 |
| 2,872,670 | Dickinson | Feb. 3, 1959 |
| 2,974,315 | Lebel et al. | Mar. 7, 1961 |